(12) United States Patent
Chen et al.

(10) Patent No.: US 6,624,599 B1
(45) Date of Patent: Sep. 23, 2003

(54) COMPACT SINGLE-STAGE ELECTRONIC BALLAST CIRCUIT FOR EMERGENCY LIGHTING APPLICATIONS

(75) Inventors: Yu-Kai Chen, Taipei (TW); Tsai-Fu Wu, Chiai (TW); Yung-Chun Wu, Kaohsiung (TW); Chin-Hsiung Chang, Taichung (TW)

(73) Assignee: Fego Precision Industrial Co., Ltd., Taichung (TW)

( * ) Notice: Subject to any disclaimer, the term of this patent is extended or adjusted under 35 U.S.C. 154(b) by 0 days.

(21) Appl. No.: 10/096,308

(22) Filed: Mar. 13, 2002

(51) Int. Cl.[7] .................................................. G05F 1/00
(52) U.S. Cl. ...................... 315/291; 315/307; 315/224; 315/209 R; 315/246; 315/276
(58) Field of Search ................................. 315/291, 307, 315/224, 225, 209 R, 200 R, 219, 246, 274, 276, 282

(56) References Cited

U.S. PATENT DOCUMENTS 6,005,353 A * 12/1999 Blom ...................... 315/209 R
6,144,172 A * 11/2000 Sun ............................ 315/291

* cited by examiner

*Primary Examiner*—Don Wong
*Assistant Examiner*—Tuyet T. Vo
(74) *Attorney, Agent, or Firm*—Troxell Law Office PLLC

(57) ABSTRACT

A compact single-stage electronic ballast circuit for emergency lighting applications, integrating the functions of a flyback charger, a flyback discharger and a half-bridge series resonant parallel loaded electronic ballast into a single-stage electronic ballast. The present invention only employs two active switches so as to achieve an electronic ballast for emergency lighting applications when the electricity is out. Furthermore, the present invention reduces the fabrication cost by simplifying the circuit configuration and reducing the number of employed active switching elements.

3 Claims, 5 Drawing Sheets

COMPACT SINGLE-STAGE ELECTRONIC BALLAST CIRCUIT FOR EMERGENCY LIGHTING APPLICATIONS

BACKGROUND OF THE INVENTION

1. Field of the Invention

The present invention generally relates to a compact single-stage electronic ballast circuit for emergency lighting applications, and more particularly, to a compact single-stage electronic ballast circuit, having the features of battery charging, discharging and lamp ballasting so as to reduce the fabrication cost by simplifying the circuit configuration and reducing the number of employed active switching elements.

2. Description of the Prior Art

The use of a multi-stage power converter suffers from increased volume and weight. Such a multi-stage power converter employs a considerable amount of elements, which results in high fabrication cost. Furthermore, the overall power conversion efficiency may also decrease due to multi-stage conversion. These drawbacks are unacceptable since the modern-day standards require high efficiency, low cost, small volume and lightness. Therefore, efforts have been made to provide single-stage converters with multiple functions so as to overcome the foregoing problems.

With the rapid development in power conversion technology, the safety regulations have become strict. A state-of-the-art electrical power conversion system is required to possess various functions. An UPS (uninterruptible power supply), for example, employs a charger and a discharger to assist the storage and/or the release of power and a converter to convert direct-current (DC) voltages into alternate-current (AC) voltage so as to provide required power during the electricity interruption. Furthermore, an electronic ballast or a DC power converter with the function of active power factor correction is used an additional stage of power converter to perform unit power factor.

Accordingly, a single-stage system integrating a plurality of power converters to reduce the fabrication cost has become a tendency.

To date, electronic ballasts for emergency lighting applications are exemplified as below.

Please refer to FIG. 1A, which is a commonly used circuit configuration in the prior art. When the electricity is provided normally, the switch $S_1$ is turned on. The power passes through the half-bridge series-resonant parallel-loaded electronic ballast to light up the lamp. Also, the electricity passes through the flyback charger to charge the battery. Furthermore, the switch $S_2$ is turned off, preventing the battery from discharging. On: the contrary, when the electricity is provided abnormally, the battery voltage $V_B$ is increased by the flyback discharger to a voltage level under normal electricity, thus lighting up the lamp by the electronic ballast.

FIG. 1B shows a modification of the circuit in FIG. 1A, in which the charger and the discharger are integrated and bi-directional switches $M_3$ and $M_4$ are used to implement bi-directional charging/discharging. When a charger is concerned, a flyback circuit is formed of $M_3$ and $D_4$ to charge the battery; and when a discharger is considered, a flyback circuit is formed of $M_4$ and $D_3$ to increase the battery voltage to a voltage level under normal electricity. It is obvious from the above discussion that, under proper control, the active switches $M_3$ and $M_4$ can be used to implement bi-directional charging/discharging.

Even though the prior arts disclosed in FIG. 1A and FIG. 1B can achieve electronic ballasts for emergency lighting applications, these circuit configurations suffer from a large number of elements and high fabrication cost. Therefore, the present invention provides an integrated single-stage converter circuit as shown in FIG. 2, in which only two active switches $M_{S1}$ and $M_{S2}$ are required. The single-stage converter circuit according to the present invention can, with reduced cost and volume, achieve the same functions as the prior arts disclosed in FIG. 1A and FIG. 1B. Furthermore, the active switches $M_{S1}$ and $M_{S2}$ have high efficiency due to a zero voltage switching (ZVS) turn-on feature.

SUMMARY OF THE INVENTION

Therefore, the present invention has been made to solve such problems in view of the forgoing status and to further provide an electronic ballast that functions as a multi-conversion to store power in the battery by a charger when electricity is provided normally and to achieve emergency lighting by a discharger when electricity is interrupted.

The present invention integrates a charger, a discharger and an electronic ballast as a single-stage circuit so as to simplify the circuit configuration and to reduce the cost. In addition, the related reports only emphasize on a lamp lighting system of high-voltage power source without high-frequency voltage conversion. In the present invention, a 12-volt battery is employed to light up the lamp. However, the DC voltage for an electronic ballast is 156V (the rectified and filtered value of the provided electricity $110V_{rms}$) Therefore, a transformer for increasing low voltage to high voltage is required. To date, researches of a single-stage converter with such a transformer for emergency lighting applications have never been found in publications such as patent applications and journal papers.

The primary object of the present invention is to implement an electronic ballast for emergency lighting applications by using a minimize number of elements to reduce the size and cost.

Other and further features, advantages and benefits of this invention will become apparent in the following description taken in conjunction with the following drawings. It is to be understood that the foregoing general description and following detailed description are exemplary and explanatory but are not to be restrictive of the invention. The accompanying drawings are incorporated in and constitute a part of this application and, together with the description, serve to explain the principles of the invention in general terms. Like numerals refer to like arts throughout the disclosure.

BRIEF DESCRIPTION OF THE DRAWINGS

The objects, spirits and advantages of the preferred embodiment of the present invention will be readily understood by the accompanying drawings and detailed descriptions, wherein.

DETAILED DESCRIPTION OF THE INVENTION

The present invention disclosing a compact single-stage electronic ballast circuit for emergency lighting applications can be exemplified by the preferred embodiment as described hereinafter.

Figure 1A:
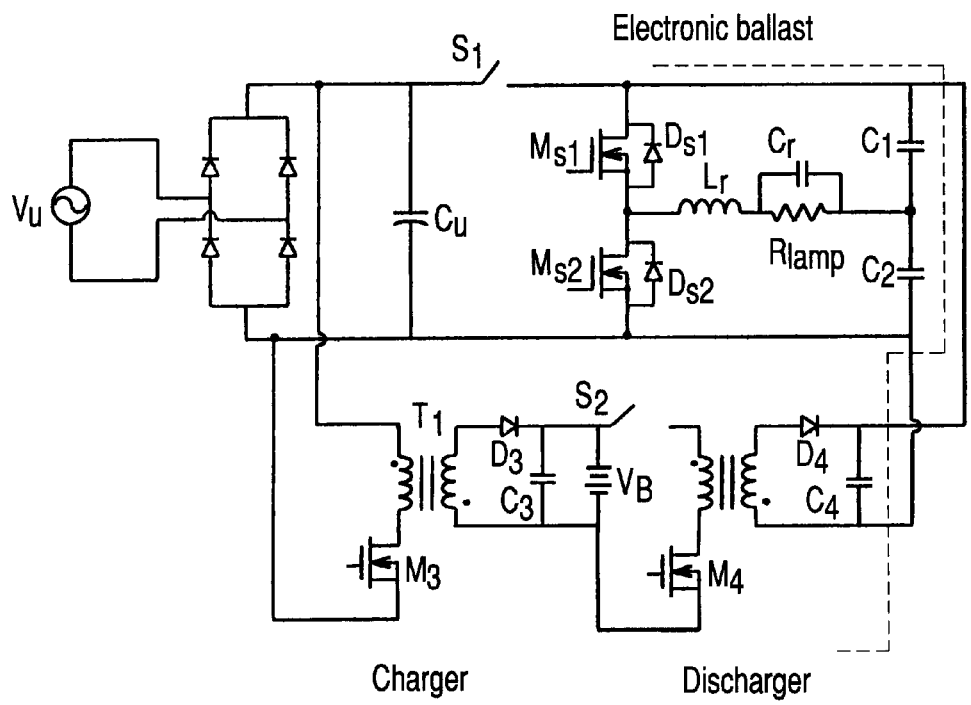
FIG. 1A is a circuit configuration of a conventional electronic ballast for emergency lighting applications in the prior art.
Figure 1B:
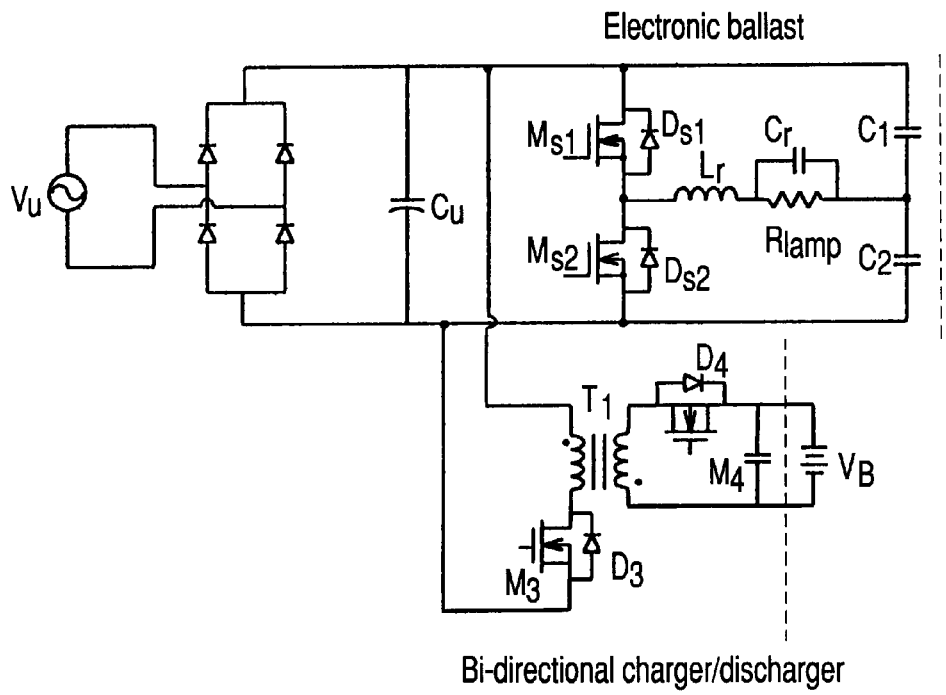
FIG. 1B is a circuit configuration of another conventional electronic ballast for emergency lighting applications in the prior art.
Figure 2:
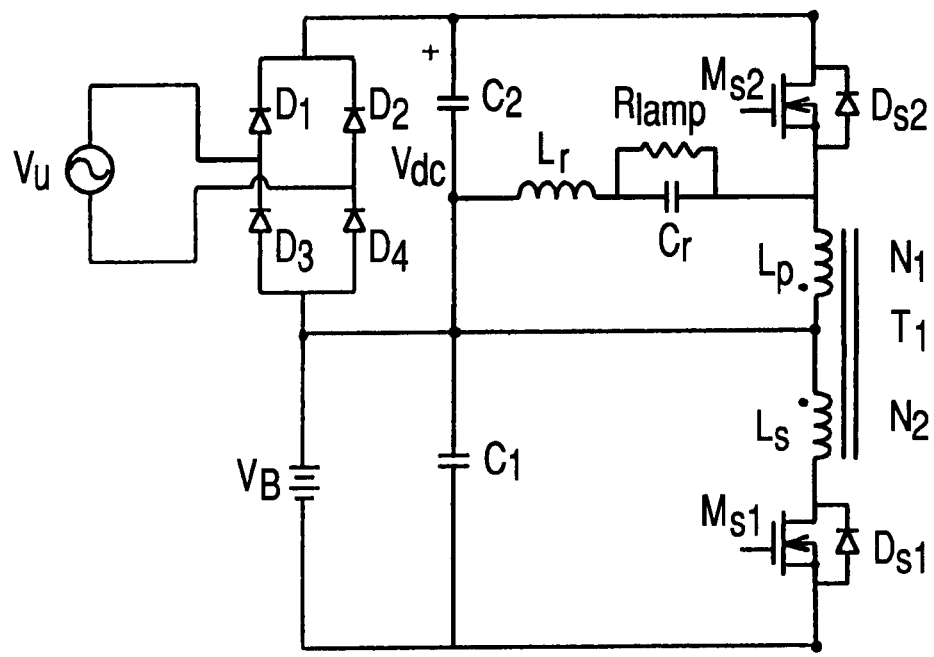
FIG. 2 is a circuit configuration of a single-stage electronic ballast for emergency lighting applications in accordance with the preferred embodiment of the present invention.

To start with, please refer to FIG. 2 which a circuit configuration of a compact single-stage electronic ballast circuit for emergency lighting applications in accordance with the preferred embodiment of the present invention. As shown in the figure, the compact single-stage electronic ballast for emergency lighting applications comprises: an input power supply, composed of diodes $D_1$, $D_2$, $D_3$ and $D_4$ to form a bridge rectifier that converts the electricity $V_u$ to provide the compact single-stage electronic ballast circuit with power required; a storage voltage source $V_B$, which is a battery for charging/discharging to be connected to the input power supply, so as to store and provide the power for lighting up the lamp; a first capacitor $C_1$, connected to the storage voltage source $V_B$ in parallel, so as to store the power during the switching operation of the compact single-stage electronic ballast circuit; and a second capacitor $C_2$, connected to the first capacitor $C_1$ in series, so as to store the power during the switching operation of the compact single-stage electronic ballast circuit.

In FIG. 2, the circuit configuration also comprises: a first active switch $M_{S1}$, connected to the first capacitor $C_1$ in series, so as to perform the switching operation in the compact single-stage electronic ballast circuit; a second active switch $M_{S2}$, connected to the second capacitor $C_2$ in series, so as to perform the switching operation in the compact single-stage electronic ballast circuit; a load resonant circuit, comprising a inductor $L_r$, a capacitor $C_r$ and a lamp-load equivalent resistance $R_{lamp}$ connected in series, wherein one end is connected to the node between the first capacitor C, and the second capacitor $C_2$, and the other end is connected to one terminal (the source) of the second active switch $M_{S2}$ so as to provide the lamp load with resonance; and an inductor-based power storage element $T_1$, connected in series between the first active switch $M_{S1}$ and the second active switch $M_{S2}$, wherein the center of the inductor-based power storage element $T_1$ is connected to the node between the first capacitor Cl and the second capacitor $C_2$, so as to store the power during the switching operation of the compact single-stage electronic ballast circuit. In addition, the body diodes in the first active switch $M_{S2}$ and the second active switch $M_{S2}$ are diodes $D_{S1}$ and $D_{S2}$, respectively.

In the present invention, the first active switch $M_{S1}$ and the second active switch $M_{S2}$ are controlled to enable the compact single-stage electronic ballast circuit to integrate the features of a charger, a discharger and an electronic ballast. When the input power supply operates normally, the storage voltage source $V_B$ is charged and the electronic ballast circuit lights up the lamp. When the input power supply fails to operate normally, the storage voltage source $V_B$ is discharged to provide the electronic ballast circuit with power.

In the compact single-stage electronic ballast circuit for emergency lighting applications in accordance with the present invention, when the input power supply operates normally, a flyback charger is formed to charge the storage voltage source $V_B$, and the half-bridge series resonant parallel loaded electronic ballast circuit is operated to drive the lamp. On the contrary, when the input power supply stops to provide electricity, a flyback discharger is formed to release power to enable the electronic ballast circuit to drive the lamp.

The operation modes of the compact single-stage electronic ballast circuit according to the present invention are described hereinafter.

A. Analysis of the Bi-directional Charger/ Discharger

Figure 3A:
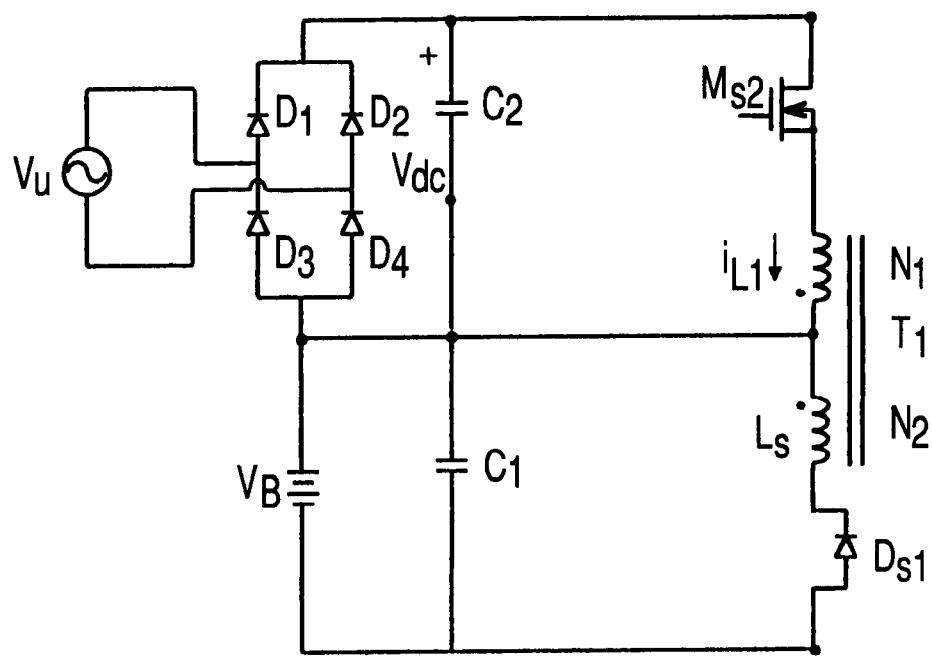
FIG. 3A is a circuit configuration having the functions of a charger and an electronic ballast, showing that the switch $M_{S1}$ is turned off and the current flows through the diode $D_{S1}$, in accordance with the preferred embodiment of the present invention.
Figure 3B:
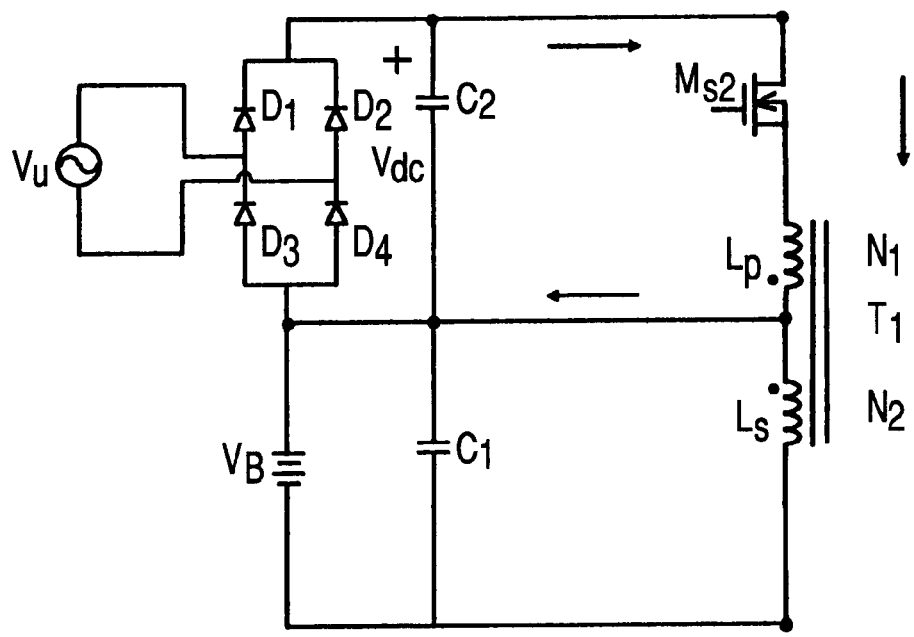
FIG. 3B is a circuit configuration having the functions of a charger and an electronic ballast, showing that the switch $M_{S1}$ is turned off and the switch $M_{S2}$ is turned on, in accordance with the preferred embodiment of the present invention.
Figure 3C:
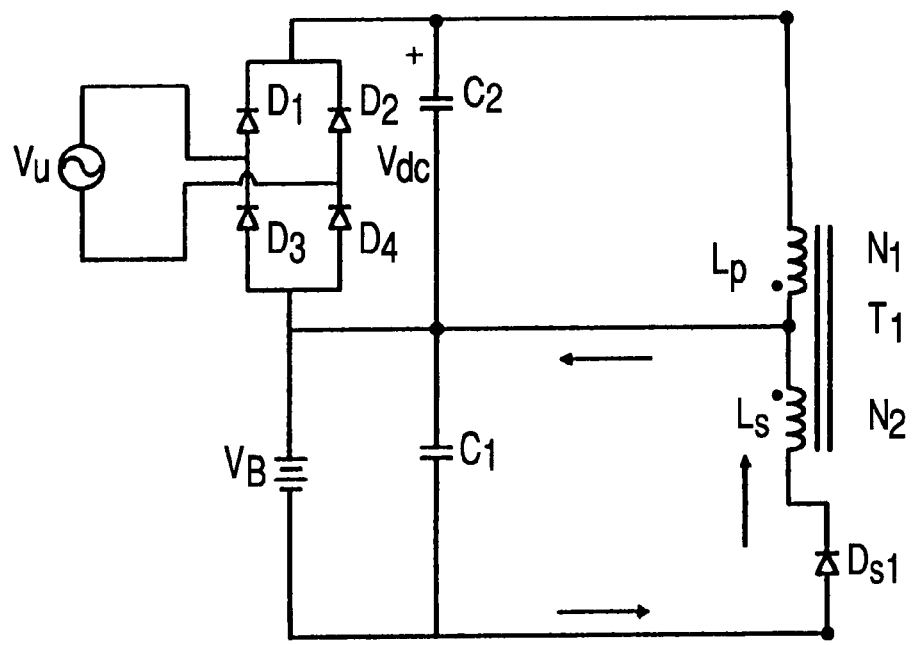
FIG. 3C is a circuit configuration having the functions of a charger and an electronic ballast, showing that the switch $M_{S2}$ is turned off and the diode $D_{S1}$ is turned on, in accordance with the preferred embodiment of the present invention.

When the compact single-stage electronic ballast circuit for emergency lighting applications is used as a charger as shown in FIG. 3A, it can be regarded as a flyback charger that receives the electricity from the power supply and then charges the battery. In the drawing, $M_{S2}$ is an active switch and $M_{S1}$ is regarded as a passive switch. The resonant inductor $L_r$, the resonant capacitor $C_1$ and lamp resistor $R_{lamp}$ are shown with dotted lines, which form a flyback charger with a battery as a load. Assume that all the transistors and diodes are ideal elements and the circuit operates in continuous conduction mode (CCM). When the power switch $M_{S2}$ is turned on (while $M_{S1}$ is turned off), the current $i_{L1}$ gets larger and the inductor $L_p$ stores the power, as shown in FIG. 3B. When the driving signal of $M_{S2}$ is interrupted, $M_{S2}$ is turned off and the body-diode $D_{S1}$ (which is connected to $M_{S1}$ in parallel) is turned on, as shown in FIG. 3C. Meanwhile, the inductor current $i_{L1}$ gets smaller and the inductor $L_s$ releases power to the battery. As it goes on and on, the provided electricity may be converted by a power converter to charge the battery. Furthermore, we can obtain the relation between the voltage of provided electricity $V_{dc}$ and the storage voltage source $V_B$, which is expressed as:

$$\frac{V_B}{V_{dc}} = \frac{D}{1-D} \times \frac{N_1}{N_2} \qquad (1)$$

wherein D denotes the duty ratio of the power switch $M_{S2}$.

Figure 4A:
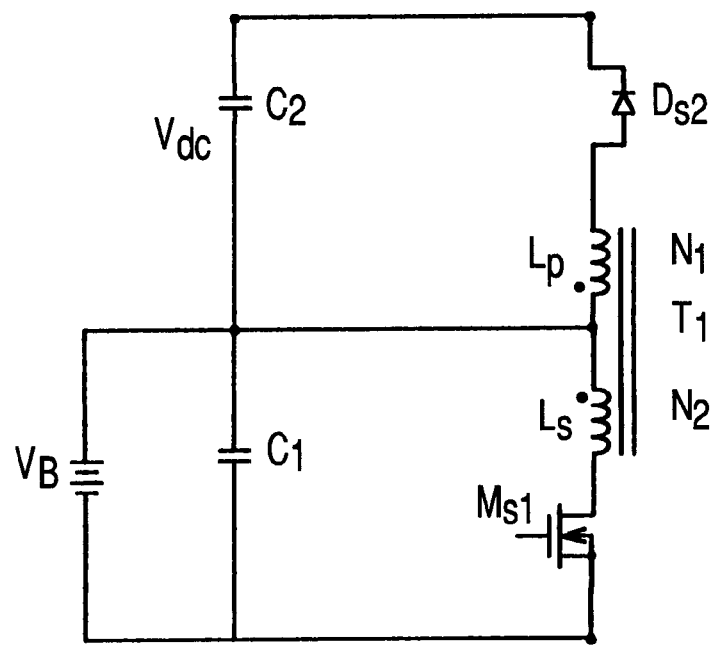
FIG. 4A is a circuit configuration having the functions of a discharger and an electronic ballast, showing that the switch $M_{S1}$ is turned on, the switch $M_{S2}$ is turned off and the current flows through the diode $D_{S2}$, in accordance with the preferred embodiment of the present invention.
Figure 4B:
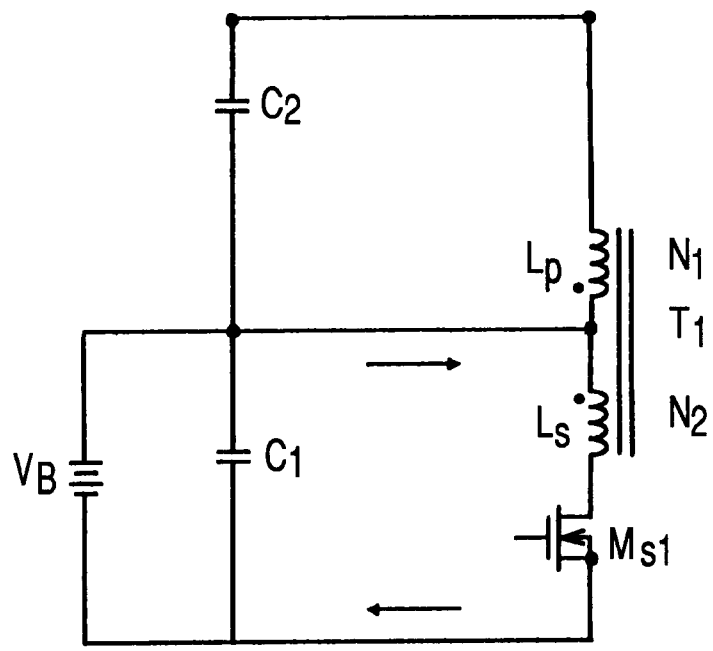
FIG. 4B is a circuit configuration having the functions of a discharger and an electronic ballast, showing that the switch $M_{S1}$ is turned on and the switch $M_{S2}$ is turned off, in accordance with the preferred embodiment of the present invention.
Figure 4C:
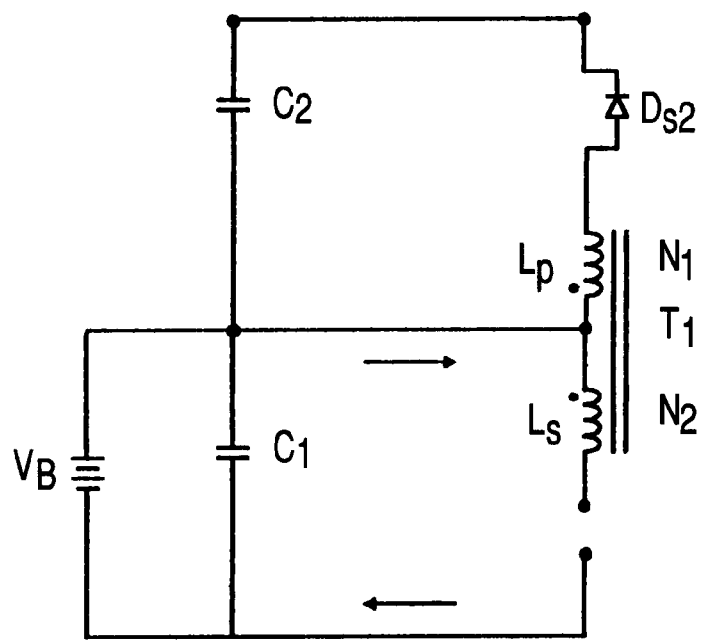
FIG. 4C is a circuit configuration having the functions of a discharger and an electronic ballast, showing that the switch $M_{S1}$ is turned off and the diode $D_{S2}$ is turned on, in-accordance with the preferred embodiment of the present invention.

When the electricity is provided abnormally, the single-stage electronic ballast can be regarded as a discharger, as shown in FIG. 4A. when the battery operates in a discharging mode, $M_{S2}$ acts as a passive switch and $M_{S1}$ acts as an active switch. When the power switch $M_{S1}$ is turned on ($M_{S2}$ is turned off), the equivalent circuit is as shown in FIG. 4B and the battery releases power to be stored by the inductor $L_s$. When the driving signal of the power switch $M_{S1}$ is interrupted, the body-diode $D_{S2}$ (which is connected to $M_{S2}$ in parallel) is turned on and the equivalent circuit is as shown in FIG. 4C. Meanwhile, the inductor current $i_{L1}$ gets smaller and the inductor $L_p$ releases power to the capacitor $C_2$. That is, the battery releases power to the capacitor $C_2$. Furthermore, we can obtain the relation between the voltage of provided electricity $V_{dc}$ and the storage voltage source $V_B$, which is expressed as:

$$\frac{V_{dc}}{V_B} = \frac{D}{1-D} \times \frac{N_2}{N_1} \qquad (2)$$

wherein D denotes the duty ratio of the power switch $M_{S1}$.

From the foregoing discussion, when D is around 50%, the voltage of provided electricity $V_{dc}$ is increased to $N_2/N_1$ the battery voltage, which is high enough to drive the lamp. Therefore, when the provided electricity is abnormal, the system according to the present invention can still drive a fluorescent lamp by using the power from the battery.

In order to obtain a large output power at the output, the inductors in the circuit must be designed to be larger than those under the boundary condition between continuous conduction mode (CCM) and discontinuous conduction mode (DCM) ashen the bidirectional flyback charger/discharger operates in continuous conduction mode (CCM). The boundary condition indicates a zero inductor current when the conduction cycle ends. Therefore, we obtain the inductor $L_s$ expressed as:

$$L_s > \frac{(V_0 + V_f)(1 - D_{max})T_s}{\Delta f_{sb}} \qquad (3)$$

wherein $V_o$ represents the output voltage, $V_f$ the forward voltage drop of the diode, $T_s$ the reciprocal of the switching frequency, $I_{sb}$ the peak current along $L_s$, $D_{max}$ the maximum duty ratio. Furthermore, if the circuit operates in continuous conduction mode (CCM), the control over the operation of the whole circuit is easier, resulting in a simplified design.

Figure 5:
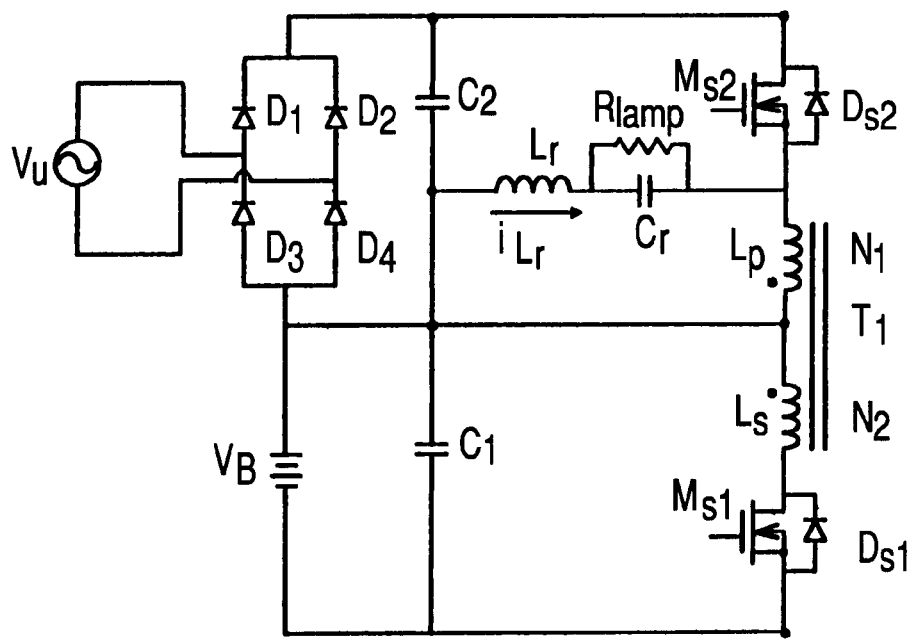
FIG. 5 is a circuit configuration for analyzing a series-resonant parallel-loaded in accordance with the preferred embodiment of the present invention.

B. Analysis of the Series Resonant Parallel Loaded Inverter (SRPLI):

In FIG. 5, it is shown a circuit configuration for analyzing a series-resonant parallel loaded inverter, wherein $L_r$ denotes the resonant inductor, $C_r$ denotes the resonant capacitor and $R_{lamp}$ is the equivalent resistance of the lamp. Furthermore, both $M_{S1}$ and $M_{S2}$ are high-frequency switches and compose a half-bridge converter. The operation principles of the circuit is described as below:

Assume the power switch driving frequency $\omega_S$ is larger than the resonant frequency $\omega_R$ and the voltages across the capacitors $C_1$ and $C_2$ are constant. When the power switch $M_{S1}$ is turned on ($M_{S2}$ is turned off), the current $i_{L_r}$ flows into the resonant circuit and provides the lamp with power. Since the operation frequency $\omega_S$ is higher than the resonant frequency colt, $M_{S1}$ is turned off when the driving Signal of the power switch $M_{S1}$ is interrupted. But meanwhile, there is still some current flowing through the resonant inductor $i_{L_r}$. In order to keep the current continuity on the inductor, the body-diode $D_{S2}$ (which is connected to the $M_{S2}$) is turned on and forms a loop. Meanwhile the inductor current gets smaller. When $D_{S2}$ is turned on, a driving signal is delivered to $M_{S2}$. Meanwhile, the voltage drop $V_{DS}$ across the power switch is almost zero, leading to a very small loss of the $M_{S2}$. Such a phenomenon is called zero voltage switching (ZVS). When the inductor current flows in a reversed direction through the power transistor $M_{S2}$, $D_{S2}$ is turned off. Similarly, when the driving signal of the power Switch $M_{S2}$ is interrupted, $M_{S2}$ is turned off. In order to keep the current continuity on the inductor, the body-diode $D_{S1}$ (which is connected to the $M_{S1}$) is turned on and forms a loop. Meanwhile the inductor current gets smaller and zero voltage switching (ZVS) can be obtained. Therefore, the electronic ballast has little switching loss, resulting in a high efficiency.

According to the above discussion, the present invention discloses a compact single-stage electronic ballast circuit for emergency lighting applications, having the features of battery charging, discharging and lamp ballasting so as to reduce the fabrication cost by simplifying the circuit configuration and reducing the number of employed active switching elements. Therefore, the present invention has been examined to be progressive, advantageous and applicable to the industry.

Although this invention has been disclosed and illustrated with reference to particular embodiments, the principles involved are susceptible for use in numerous other embodiments that will be apparent to persons skilled in the art. This invention is, therefore, to be limited only as indicated by the scope of the appended claims.

What is claimed is:

1. A compact single-stage electronic ballast circuit for emergency lighting applications, comprising:
    an input power supply, providing the compact single-stage electronic ballast circuit with power required;
    a storage voltage source, connected to the input power supply, so as to store the power;
    a first capacitor, connected to the storage voltage source in parallel, so as to store the power during the switching operation of the compact single-stage electronic ballast circuit;
    a second capacitor, connected to the first capacitor in series, so as to store the power during the switching operation of the compact single-stage electronic ballast circuit;
    a first active switch, connected to the first capacitor in series, so as to perform the switching operation in the compact single-stage electronic ballast circuit;
    a second active switch, connected to the second capacitor in series, so as to perform the switching operation in the compact single-stage electronic ballast circuit;
    a load resonant circuit, wherein one end is connected to the node between the first capacitor and the second capacitor, and the other end is connected to one terminal of the second active switch so as to provide the lamp load with resonance; and
    an inductor-based power storage element, connected in series between the first active switch and the second active switch, wherein the center of the inductor-based power storage element is connected to the node between the first capacitor and the second capacitor, so as to store the power during the switching operation of the compact single-stage electronic ballast circuit;

wherein, the operation of the first active switch and the second active switch enables the single-stage electronic ballast circuit to integrate the features of a charger, a discharger and an electronic ballast; the storage voltage source is charged to perform the operation of the electronic ballast circuit when the input power supply normally works, while the storage voltage source is discharged to provide power to perform the operation of the electronic ballast circuit when the input power supply cannot provide power; and a half-bridge series resonant parallel loaded electronic ballast is formed when the input Dower supply normally works.

2. The compact single-stage electronic ballast circuit for emergency lighting applications as recited in claim 1, wherein a flyback charger is formed when the input power supply normally works.

3. The compact single-stage electronic ballast circuit for emergency lighting applications as recited in claim 1, wherein a flyback discharger is formed when the electricity provided stops to provide power.

\* \* \* \* \*